(12) United States Patent
Hsu et al.

(10) Patent No.: US 7,746,925 B1
(45) Date of Patent: *Jun. 29, 2010

(54) DECODING METHOD AND APPARATUS

(75) Inventors: Yungping Hsu, Saratoga, CA (US); Nelson Xu, Cupertino, CA (US); Ricky Cheung, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 175 days.

This patent is subject to a terminal disclaimer.

(21) Appl. No.: 11/528,037

(22) Filed: Sep. 27, 2006

Related U.S. Application Data

(62) Division of application No. 10/080,826, filed on Feb. 21, 2002, now Pat. No. 7,263,119.

(60) Provisional application No. 60/334,347, filed on Nov. 29, 2001.

(51) Int. Cl.
*H03H 7/30* (2006.01)
*H03K 5/159* (2006.01)

(52) U.S. Cl. .................. 375/233; 375/234; 375/235; 375/236

(58) Field of Classification Search ............. 375/233, 375/234, 343, 350, 318, 150, 229, 230, 231, 375/232, 225, 226, 227; 708/252, 323; 381/71.1, 381/71.8; 370/436, 447, 538, 389, 391, 537
See application file for complete search history.

(56) References Cited

U.S. PATENT DOCUMENTS 5,625,640 A * 4/1997 Palmer et al. ............... 375/132

| | | | |
|---|---|---|---|
| 5,903,554 A | 5/1999 | Saints | |
| 6,012,161 A * | 1/2000 | Ariyavisitakul et al. ...... | 714/795 |
| 6,144,697 A * | 11/2000 | Gelfand et al. .............. | 375/233 |
| 6,252,898 B1 | 6/2001 | Eto et al. | |
| 6,275,485 B1 | 8/2001 | Padovani | |
| 6,278,726 B1 | 8/2001 | Mesecher et al. | |
| 6,292,519 B1 | 9/2001 | Popovic | |
| 6,356,586 B1 * | 3/2002 | Krishnamoorthy et al. .. | 375/233 |
| 6,603,801 B1 * | 8/2003 | Andren et al. .............. | 375/147 |
| 6,608,864 B1 | 8/2003 | Strait | |
| 6,735,422 B1 | 5/2004 | Baldwin et al. ............. | 455/232 |

(Continued)

FOREIGN PATENT DOCUMENTS

WO    WO 00/72540 A1    11/2000

(Continued)

OTHER PUBLICATIONS

Bob Pearson, "Complementary Code Keying Made Simple" Application Note Nov. 2001, AN9850.0.

(Continued)

*Primary Examiner*—Chieh M Fan
*Assistant Examiner*—Qutbuddin Ghulamali

(57) ABSTRACT

A feedback equalizer includes a summing unit having an output and first input for receiving a modulated signal, which includes a symbol defined by a first number of chips. A subsymbol processor is coupled to the output of the summing unit. The symbol processor is capable of generating a subsymbol waveform upon receipt of a second number of chips of the symbol. The second number is less than the first number. A feedback filter is coupled to a second input of the summing unit and the symbol processing unit to selectively filter the subsymbol waveform from the modulated signal.

14 Claims, 12 Drawing Sheets

U.S. PATENT DOCUMENTS

| | | | |
|---|---|---|---|
| 6,775,322 B1 * | 8/2004 | Zangi et al. | 375/232 |
| 6,882,692 B2 | 4/2005 | Somayazulu | 375/343 |
| 6,937,648 B2 * | 8/2005 | Raphaeli | 375/229 |
| 6,965,651 B1 | 11/2005 | Chou | |
| 7,023,938 B1 | 4/2006 | Kapoor et al. | |
| 7,035,329 B2 * | 4/2006 | Jayaraman et al. | 375/233 |
| 2001/0036223 A1 * | 11/2001 | Webster et al. | 375/152 |
| 2002/0009064 A1 | 1/2002 | Blessent et al. | 370/335 |
| 2002/0070796 A1 | 6/2002 | Gay-Bellile et al. | 329/304 |
| 2003/0016640 A1 | 1/2003 | Onggosanusi et al. | 370/335 |
| 2003/0095588 A1 | 5/2003 | Yellin et al. | 375/147 |
| 2003/0151469 A1 | 8/2003 | Blinn et al. | 333/165 |

FOREIGN PATENT DOCUMENTS

| | | |
|---|---|---|
| WO | WO 01/03334 A1 | 5/2001 |
| WO | WO 01/35541 | 5/2001 |
| WO | WO 01/61902 A1 | 8/2001 |

OTHER PUBLICATIONS

LAN/MAN Standards Committee of the IEEE Computer Society, " IEEE Std 802.11b-1999" (Supplement to ANSI/IEEE Std 802.11, 1999 Edition, Sep. 1999.

Jim Geier, "Wireless LANs, Second Edition" Sams Publishing, 2002.

Anita Karve, Network Magazine, " 802.11 and Spread Spectrum" Dec. 1, 1997, http://www.networkmagazine.com/article/NMG2000726S0001.

Kanoksri Sarinnapakorn, "IEEE 802.11b 'High Rate' Wireless Local Area Netoworks" Mar. 15, 2001, http://alpha.fdu.edu/~kanoksri/IEEE80211b.html.

Harold Davis, "MightyWords Technical Briefings: Understanding 802.11b and Bluetooth" MightyWords, Inc. 2001.

ANSI/IEEE Std 802.11, 1999 Edition, Sponsor LAN MAN Standards Committee of IEEE Computer Society, "Part 11: Wireless LAN Medium Access Control (MAC) and Physical Layer (PHY) Specifications," Ch. 12 (pp. 138-146), Ch. 13 (pp. 147), Ch. 15 (pp. 195-223).

\* cited by examiner

DECODING METHOD AND APPARATUS

CROSS-REFERENCE TO RELATED APPLICATIONS

This application is a divisional of U.S. patent application Ser. No. 10/080,826 filed on Feb. 21, 2002, which claims the benefit of U.S. Provisional Application No. 60/334,347, filed Nov. 29, 2001. The disclosures of the above applications are incorporated herein by reference.

TECHNICAL FIELD

This invention is directed to decoding modulated information, and is particularly concerned with improved equalization techniques for useful in decoding such information.

BACKGROUND

The past few years has witnessed the ever-increasing availability of relatively cheap, low power wireless data communication services, networks and devices, promising near wire speed transmission and reliability. One technology in particular, described in the IEEE Standard 802.11b-1999 Supplement to the ANSI/IEEE Standard 802.11, 1999 edition, collectively incorporated herein fully by reference, and more commonly referred to as "802.11b" or "WiFi", has become the darling of the information technology industry and computer enthusiasts alike as a wired LAN/WAN alternative because of its potential 11 Mbps effective data transmission rate, ease of installation and use, and transceiver component costs make it a real and convenient alternative to wired 10 BaseT Ethernet and other cabled data networking alternatives. With 802.11b, workgroup-sized networks can now be deployed in a building in minutes, a campus in days instead of weeks since the demanding task of pulling cable and wiring existing structures is eliminated. Moreover, 802.11b compliant wireless networking equipment is backwards compatible with the earlier 802.11 1 µM/2 Mbps standard, thereby further reducing deployment costs in legacy wireless systems.

802.11b achieves relatively high payload data transmission rates through the use of orthogonal class modulation in general, and, more particularly, 8-chip complementary code keying ("CCK") at a 11 MHz chipping rate. As such, bitstream data is mapped into nearly orthogonal sequences (or code symbols) to be transmitted, where each chip of the code symbol is quaternary phase modulated. An 802.11b compliant receiver correlates the received CCK modulated signal with 64 candidate waveforms to find the most likely code symbol, from which the bitstream data is recovered through reverse mapping. The high-rate physical layer PLCP preamble and header portions are still modulated using the 802.11 compliant Barker spreading sequence at an 11 MHz chipping rate, resulting in a 1 or 2 Mbps effective header and preamble transmission rate depending on whether DBPSK or DQPSK modulation is employed.

CCK was chosen in part because of its strong inherent resistance to multipath interference, which is likely to be encountered in the typical in-building deployment. Nevertheless, the confluence of strict power limits specified for operation in the 2.4 GHz ISM band and megabit+ expected data throughput rates limits conventional 802.11b to just a 100 or so feet between stations, depending on the number of interposing radio obstructions and reflections.

Thus 802.11b remains susceptible to multipath interference, and to reception errors produced by inter-symbol ("ISI") and inter-chip interference ("ICI") in particular. To combat this, designers have sought to improve receiver performance with respect to CCK code symbol demodulation by using active equalization techniques. These include hard-decision feedback equalization of the baseband signal prior to symbol demodulation, and combining such hard-decision feed back with processing gain realized through fully decoding the perceived symbols. (See e.g. laid open patent application publication WO 00/72540 1, published Nov. 30, 2000 and incorporated herein fully by reference). However, these techniques appear to employ demodulation processing gain only after all chips of the preceding symbol have been received and correlated. Further, these techniques do not exploit non-CCK modulated information contained within the received signal, such as the PLCP header and/or preamble, for equalization purposes.

SUMMARY OF THE INVENTION

One aspect of the present invention seeks in part to improve ISI and ICI cancellation in reception of modulated symbols by selectively decoding one or more subsymbols of such modulated symbols before they can be completely decided or perceived, and employing early detected decoded subsymbol information in the feedback equalization process. Accordingly, a decoder and associated method is disclosed which includes a feedback equalizer capable of receiving a modulated signal including a symbol defined by a first number of chips; along with a subsymbol processor to generate a subsymbol waveform upon receipt of a second number, less than the first number, of chips of such symbol and provide the subsymbol waveform to the feedback equalizer in order to equalize the modulated signal using the subsymbol waveform.

Another aspect of present invention seeks to improve reception performance when symbols encoded by different modulation schemes are encountered, such as that specified for the high rate physical layer of the IEEE 802.11b standard. Yet another aspect is directed in particular to feedback equalization for Barker encoded symbols present in the received signal.

As discussed below in connection with the disclosed embodiments, symbol or subsymbol decoding, Barker feedback and multiple modulation processing consistent with the present invention may be implemented in one or more environments, including the aforementioned decoder, a feedback equalizer, or as part of a larger transceiving unit, such as a transceiver, base station, network interface, or information processing system. Also, such symbol or subsymbol decoding processing may be carried out in whole or in part by a programmed information processor programmed in accordance with the techniques consistent with the present invention.

BRIEF DESCRIPTION OF THE DRAWINGS

Additional aspects and advantages of this invention will become apparent from the following detailed description of embodiments thereof, which proceeds with reference to the accompanying drawings, to which.

DETAILED DESCRIPTION OF THE EMBODIMENTS

Figure 1:
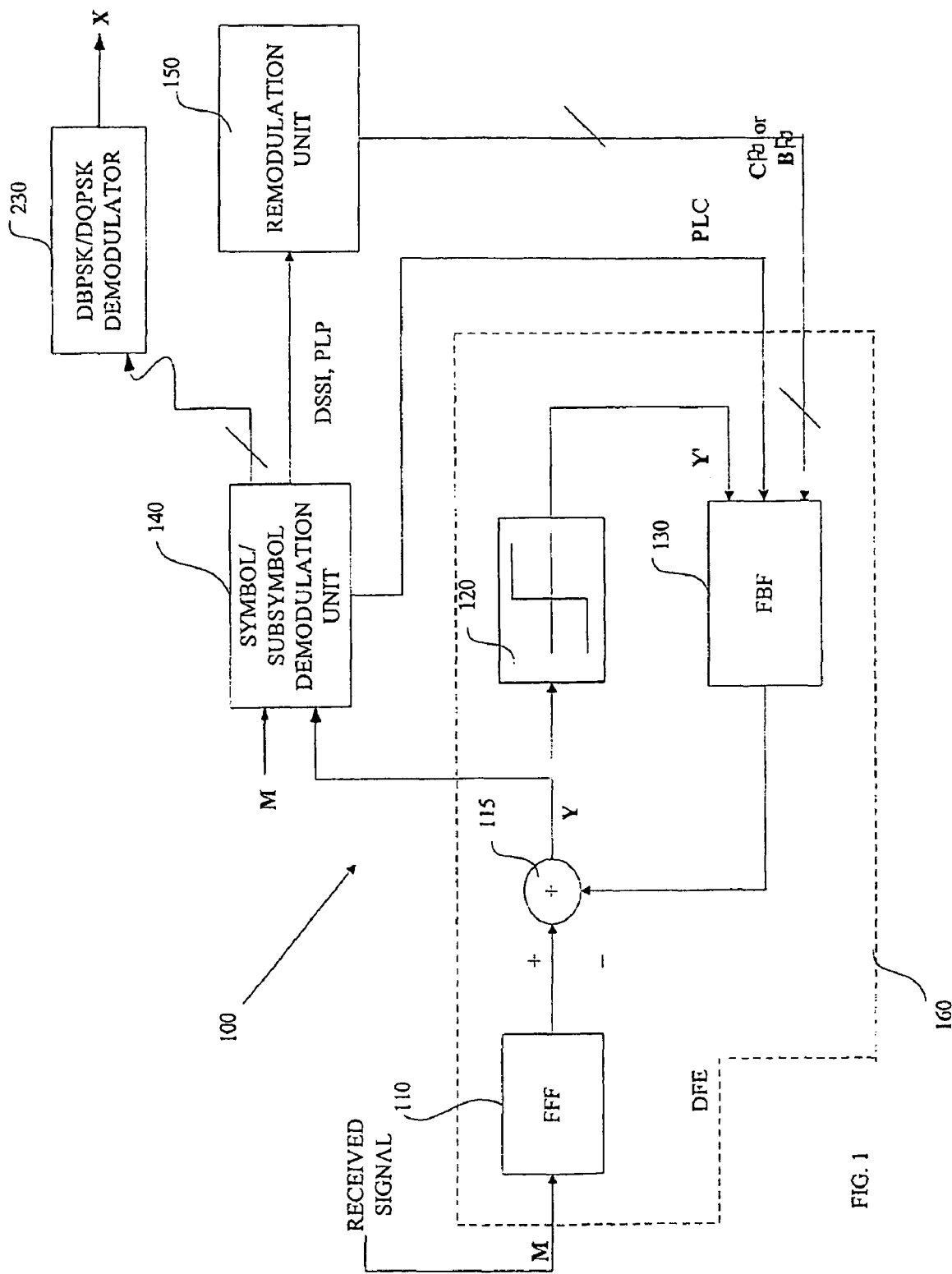
FIG. 1 is a functional block diagram of a decoding unit according to a first embodiment of the invention.

Turning first to FIG. 1, FIG. 1 is a high-level block diagram of a decoding unit 100 including a decision feedback equalizer ("DFE") 160, symbol/subsymbol demodulation unit 140 and remodulation unit 150 in accordance with a first embodiment of the invention. One purpose of this decoding unit 100 is to decode a signal incorporating one or more modulated coded symbols representing data. Consistent with this purpose, feed forward processing is employed to help ensure that a received, coded symbol modulated baseband signal possesses the minimum phase characteristics to permit symbol demodulation. In turn, decision feedback analysis complemented with selective subsymbol and/or symbol decoding is employed to mitigate inter-symbol and inter-chip interference produced at least in part by the noise enhancing effects of such feed forward processing and thus achieve equalization. This leads to improved receiver performance in noisy environments, especially where multipath interference such as multipath propagation and delay spread conditions are present.

An RF receiver (not shown, see FIG. 6) provides a baseband signal M incorporating one or more modulated code symbols to the input of feed forward filter ("FFF") 110 The FFF 110 filters the baseband signal so that it possesses the minimum phase characteristics for successful demodulation. After filtration, the resulting complex waveform is routed chip by chip through summing unit 115 to hard decision unit or slicer 120 which feeds hard decision information in the form of a complex waveform Y' on a per-chip basis to the feedback filter ("FBF") 130. In accordance with this embodiment, the FBF 130 and summing unit 115 use Y' as already detected data to assist in canceling inter-chip interference ("ICI") during certain chips of a received modulated symbol incorporated in the input signal. As will be explained in more detail below, the FBF 130 can also selectively leverage symbol decision and/or subsymbol processing gain provided by the symbol/subsymbol demodulation and remodulation units 140, 150 (collectively referred to as a symbol/subsymbol processor) to address both ICI and inter-symbol interference ("ISI") potentially lurking in the input signal. Equalized complex waveform Y incorporating these coded symbols is output from the summing unit 115 of DFE 160 coupled to the outputs of FBF 130 and FFF 110.

In this embodiment, chipped waveforms Y and M are presented serially (chip by chip, least significant chip order) to symbol/subsymbol demodulation unit 140. The symbol/subsymbol demodulation unit 140 includes logic for symbol/subsymbol decoding a modulated symbol present in Y and M which is, then DQPSK demodulated (via DBPSK/DQPSK demodulator 230) in a known manner to recover all data bits X corresponding to the signal. Full symbol decoding or decisioning consistent with this embodiment requires reception of all of the chips defining a given code symbol before decoding of that symbol can begin. Since each chip of Y and M is sent serially from the DFE 160 to the symbol/subsymbol demodulation unit 140, full symbol decoding or decisioning process takes a certain number "S" chips to complete. In the case of e.g. a Barker modulated symbol compliant with IEEE 802.11b, S=11 chips with a chip frequency of 11 MHz, and the experienced symbol decode rate is 1 or 2 Mbps depending on whether the symbols within Y are DBPSK or DQPSK modulated respectively. In the case of e.g. a CCK modulated data symbol also compliant with IEEE 802.11b, S=8 chips with a chip frequency of 11 Mhz, resulting in an effective symbol decode rate of 1.375M symbols/sec. In the case of CCK modulated data subsymbol, S=2/4/6 chips with a chip frequency of 11 MHz.

Published WIPO patent application WO 00/72540 1 appears to suggest that remapping a decoded CCK symbol back into an 8 chip CCK waveform and loading the feedback-filter once per symbol (once every 8 chips) can leverage CCK demodulator processing gain to address ISI. Thus, this reference teaches that, at the first chip of a current symbol decode, the previously decided CCK symbol is employed to perform all necessary ICI and ISI cancellation. However, for the remaining 7 chips, hard decision or slicer output (such as that would be provided by slicer 120) and/or soft decision analysis incorporating e.g. a hyperbolic tangent function approximation appears to be used exclusively to perform ICI cancellation.

However, consistent with one aspect of the present invention and in accordance with the present embodiment, a decoded subsymbol waveform based on one or more subsets of the received chips defining a given symbol may be realized and fed back to the FBF 130 while such symbol is still awaiting to be completely decided or decoded, or even before all of the chips defining that symbol are perceived, to improve ICI and ISI cancellation performance at least during subsequent chips in the decode sequence.

Partial loading of decoded subsymbol information consistent with the present embodiment of the invention attempts to reduce or eliminate "error propagation" caused by inaccurate hard decisions made by the slicer 120. Such decisions can propagate through the FBF 130 and affect decisions regarding succeeding chips of the current and following symbols, which, in turn may affect proper symbol recognition and demodulation. Instead of relying solely on hard decision processing, decision feedback analysis according to the present embodiment selectively injects a synthesized subsymbol waveform derived from decoded subsymbol information into the FBF 130 during certain chips of a symbol decode sequence to keep the FBF 130 on the right track. This is because the decoded subsymbol information is believed to be a more accurate decision spanning a number of chips of the current symbol than hard decisioning of individual chips, and when the corresponding subsymbol waveform is selectively loaded into the FBF 130 results in more accurate feedback cancellation and equalization of the baseband signal.

Accordingly, as will be discussed in more detail below, the symbol/subsymbol demodulation unit 140 depicted in FIG. 1 includes partial correlation logic (partial load control logic 250 in communication with CCK symbol/subsymbol decoder 240 as shown in FIGS. 2-5) to selectively decode at least a given subsymbol of a symbol C present in Y based on already received chip information before such symbol C is completely decoded or decided. The symbol/subsymbol demodulation unit 140 generates decoded subsymbol information (labeled as DSSI in FIG. 1) and partial load parameters (labeled as PLP in FIG. 1) corresponding to C which is used by the remodulation unit 150 in generating a chipped complex subsymbol waveform CO. CO is then at least partially parallel loaded into the FBF 130 as directed by partial loading information (e.g. variable PARTIAL) to improve ICI and ISI cancellation during succeeding chips defining symbol C and beyond.

In accordance with the present embodiment, decoded symbol/subsymbol information can be ascertained at a number of different chips into the CCK symbol decode sequence, such as at chips 2, 4, 6, or 8 during the 802.11b compliant 5.5 Mbps data rate, and chips 4, 6, or 8 at 802.11b compliant 11 Mbps data rate. In turn, the remodulation unit 150 will create CO based on the decoded symbol/subsymbol information and partial load parameters, such as the high speed rate (variable RATE discussed below) and which chip cycle(s) in the symbol decode sequence are desired for partial parallel loading (variable PARTIAL discussed below). Though not intended to be limiting in any way, subsymbol CO here will be composed of a number of chips less than or equal to the number of chips received during the current symbol decode sequence. The generated chips ($c_0 O \ldots c_k O$, $0<k<S$) of the subsymbol CO waveform will be loaded in parallel in one or more of the appropriate shift registers $T_c$ 802, 806 810, 814, 818, 822, and/or 826 (see FIG. 8) forming part of the FBF 130 via tap inputs tap0 . . . tap6 as designated in PARTIAL and controlled by the partial load control ("PLC") semaphores by the aforementioned partial load control logic 230. Here, it is contemplated that subsymbol CO will override any stored chip decision information Y' created by slicer 120.

Figure 2:
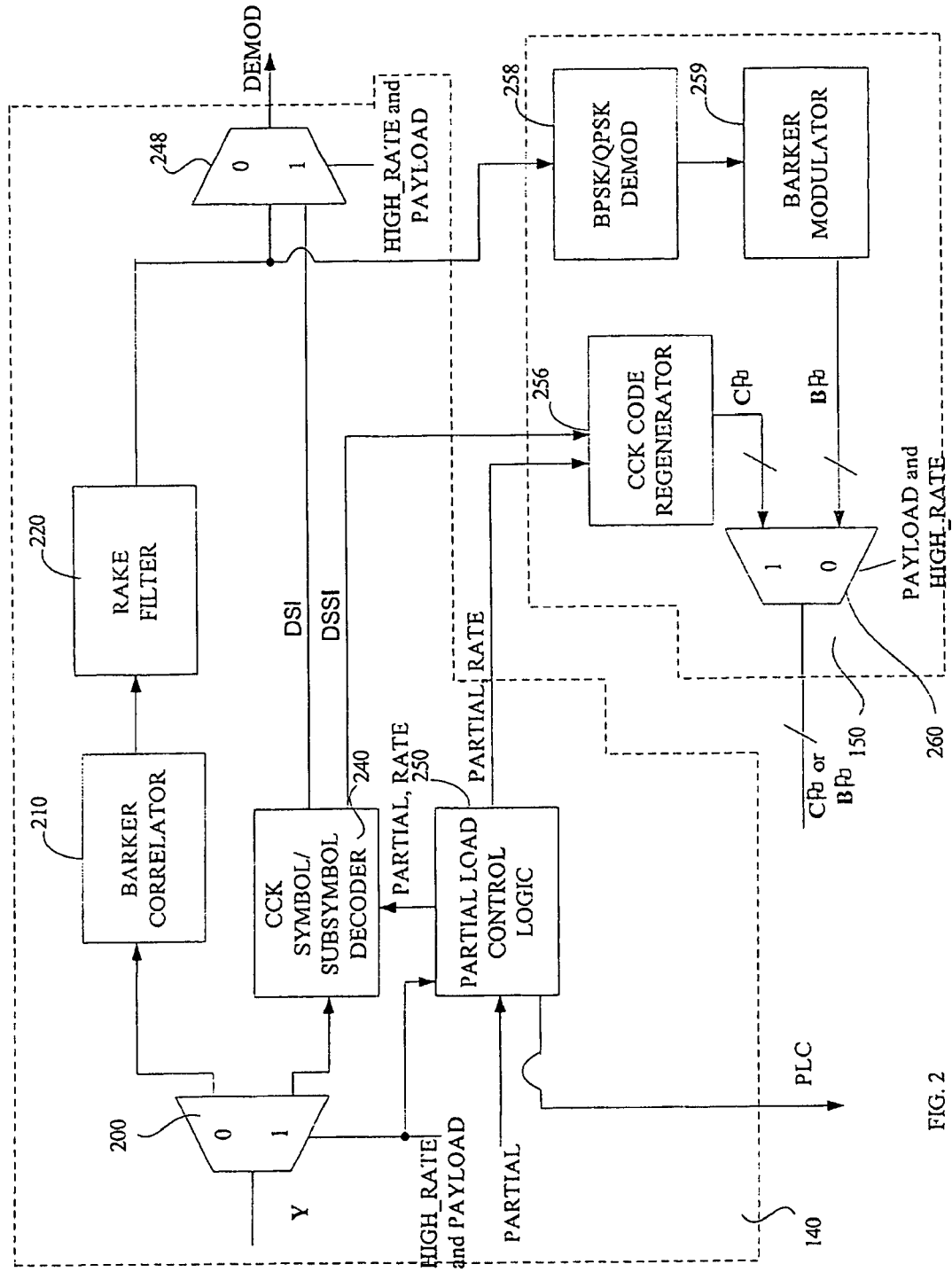
FIG. 2 is a more detailed functional block diagram of the symbol demodulation and remodulation units according to the first embodiment.

FIG. 2 shows a more detailed block diagram of the symbol/subsymbol demodulation unit 140 and remodulation unit 150 of the decoding unit 100 described above with reference to FIG. 1. At the outset, it should be noted that the present embodiment is directed to orthogonal class symbol modulation techniques utilized in IEEE 802.11b DSSS High Rate PHY wireless transmission, and thus include parallel demodulation remodulation units directed to Barker sequencing and CCK modulation respectively. In particular, a 802.11b DSSS Physical Layer Convergence Procedure ("PLCP") frame consists of a PLCP preamble, a PLCP header, and payload portion commonly known as the MAC protocol data unit ("MPDU"). To preserve backwards compatibility with base 802.11 1 and 2 Mbps transmission modes, the PLCP preamble and header is symbol encoded using Barker modulation techniques, whilst high-speed 5.5 Mbps and 11 Mbps transmission modes utilize CCK symbol modulation for the PLCP payload. Thus, in this embodiment, M is directed towards the first demodulation pathway (Barker mode-chipped serially through Barker correlator 210 and RAKE filter 220) and Y is directed towards the second demodulation pathway (CCK mode-CCK symbol/subsymbol decoder 240 and the aforementioned partial load correlation logic). Here, the demux 200 and mux 248 select between the Barker mode and CCK mode demodulation pathways based on whether the current symbol being decoded forms part of the PLCP frame payload or header/preamble. In particular, the demux 200 and mux 248 are controlled by binary logic HIGH_RATE AND PAYLOAD, wherein HIGH_RATE=true if the payload of the current PLCP frame is transmitted in accordance with 802.11b high rate PHY standards (otherwise false). PAYLOAD=true if the current symbol to be decoded is positioned within the payload section of the PLCP frame (otherwise false, e.g. symbol in PLCP headers or preamble). Both HIGH_RATE and PAYLOAD may be determined using known techniques compliant with 802.11b, such as external control logic including PLCP framing sensor or tracking circuitry, as well as through programmed operation of an information processor such as a computer or imbedded controller as will be understood by those ordinarily skilled in the art.

If either demodulation pathway is selected, full recovery of the bitstream data X corresponding to the symbols present in Y/M may be realized through feeding the output of mux 248 to the DBPSK/DQPSK demodulator 230.

When PAYLOAD is false, M is assumed to represent part of PLCP header or preamble, and is demodulated in a known manner using the aforementioned Barker mode demodulation pathway: Barker correlator 210, RAKE filter 220, and DBPSK/DQPSK demodulator 230 (FIG. 1) to obtain underlying bitstream data X. Note, however, in this embodiment, the rake filter 220 output is demodulated (through BPSK/QPSK modulator 258) and re-encoded (through Barker modulator 259) to create a decoded complex waveform BO based on chips 1-11 of a decided Barker encoded symbol B to provide enhanced ISI cancellation when loaded in the FBF 130 during the first chip of the succeeding symbol (here either a Barker or CCK-encoded symbol) via assertion of the LOAD_BARKER semaphore (part of the partial load control) by the partial load control logic 250. In this embodiment, during Barker mode, symbol prediction consistent with one aspect of the invention is not pursued and slicer output Y' is believed satisfactory to cancel experienced ICI. However, processes and apparatuses consistent with the present invention are not intended to be so limited and in fact encompasses other embodiments in which partial Barker mode or other orthogonal class demodulation techniques may include symbol and/or subsymbol decoding and partial loading of decoding results as discussed herein in more detail with specific reference to CCK mode, as will be appreciated by those ordinarily skilled in the art.

Alternatively, where the emphasis is primarily on improving reception/decoding performance of the payload (CCK-encoded) portion of PLCP frame, it may be sufficient to only pre-load the FBF 130 with the decided Barker-encoded symbol encountered at the end of the PLCP header in order to address ISI from the immediately following CCK-symbol in the payload. In this embodiment, the output of the Barker Modulator 259 would be isolated from the FBF 130 (FIG. 8) until the end of the PLCP header has been perceived. Thereafter, PAYLOAD and HIGH_RATE would be asserted to at least partial load decoded CCK subsymbol waveform generated by the CCK code generator 256 as specified by the aforementioned variable PARTIAL.

Figure 8:
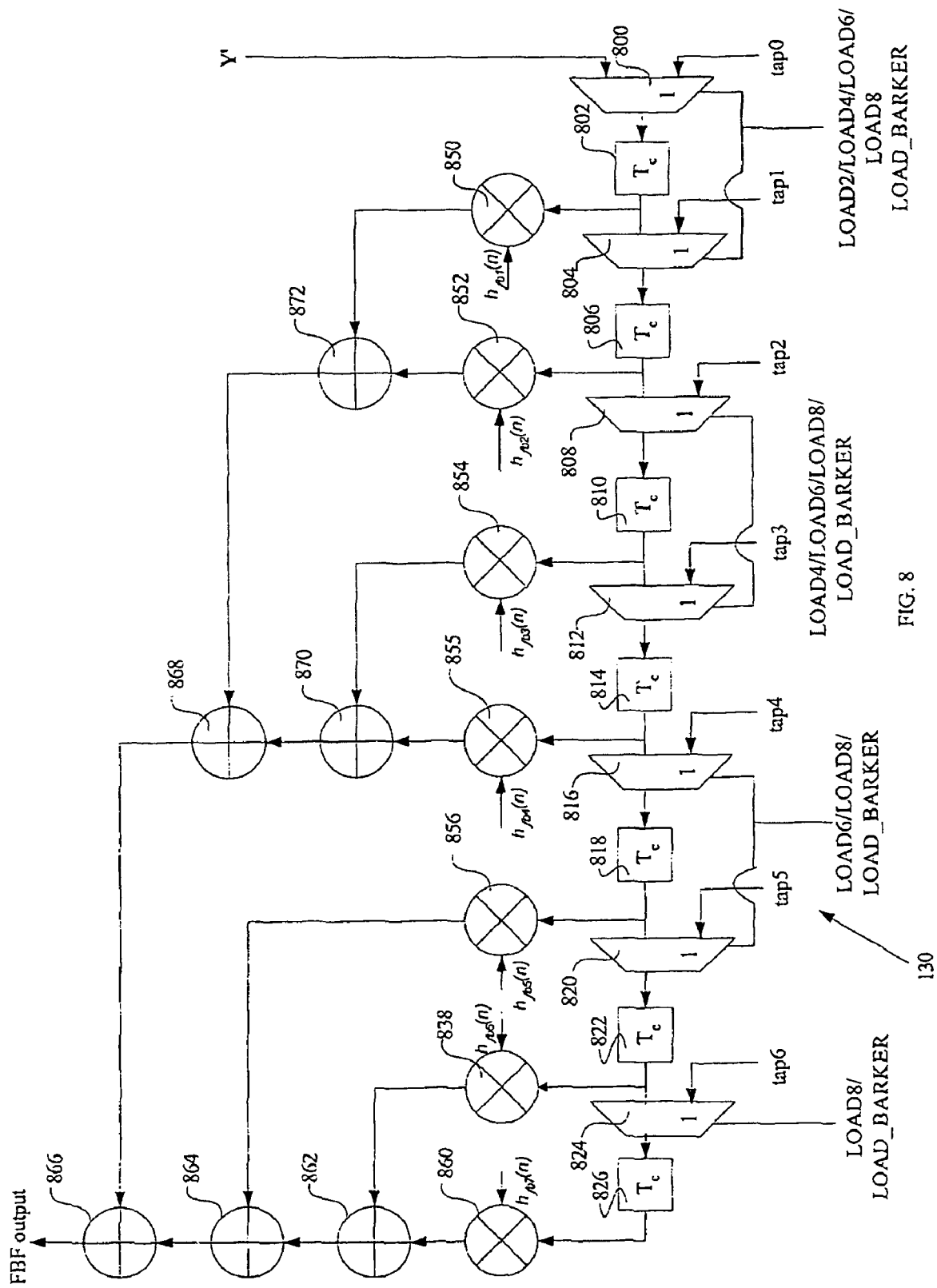
FIG. 8 is a more detailed functional block diagram of the feedback filter according to the first embodiment of the invention.

Moreover, in this embodiment, as more clearly detailed with reference to FIG. 8, though not required as one of ordinary skill will appreciate, the same FBF 130 is used for both CCK and Barker demodulation modes, even though the number of chips needed to fully express a coded symbol is different for the different modulation schemes (8 for CCK versus 11 for Barker). Investigation of Barker mode ISI cancellation consistent with the present embodiment performance reveals relatively modest processing gain when the full 11 chips of BO versus a subset thereof is used to load the FBF 130, so only the most recent 7 chips of BO are loaded to the FBF 130 via tap inputs tap0 . . . tap6 with the assertion of the LOAD_BARKER semaphore by the partial control logic 250, and the FBF 130 has a depth of only 7 taps. Likewise, in CCK mode, only the last 7 chips of decoded CO are used, even where LOAD 8 is specified and all 8 chips of C have been perceived. Again, since experienced processing gain performance is negligible in the CCK environment when all 8 chips of decoded CO are loaded into FBF 130 versus only the latest 7. Hence, as shown in FIG. 8, the FBF 130 includes only seven parallel load taps to simplify construction and reuse across both types of demodulation performed by symbol demodulation unit 140.

Figure 11:
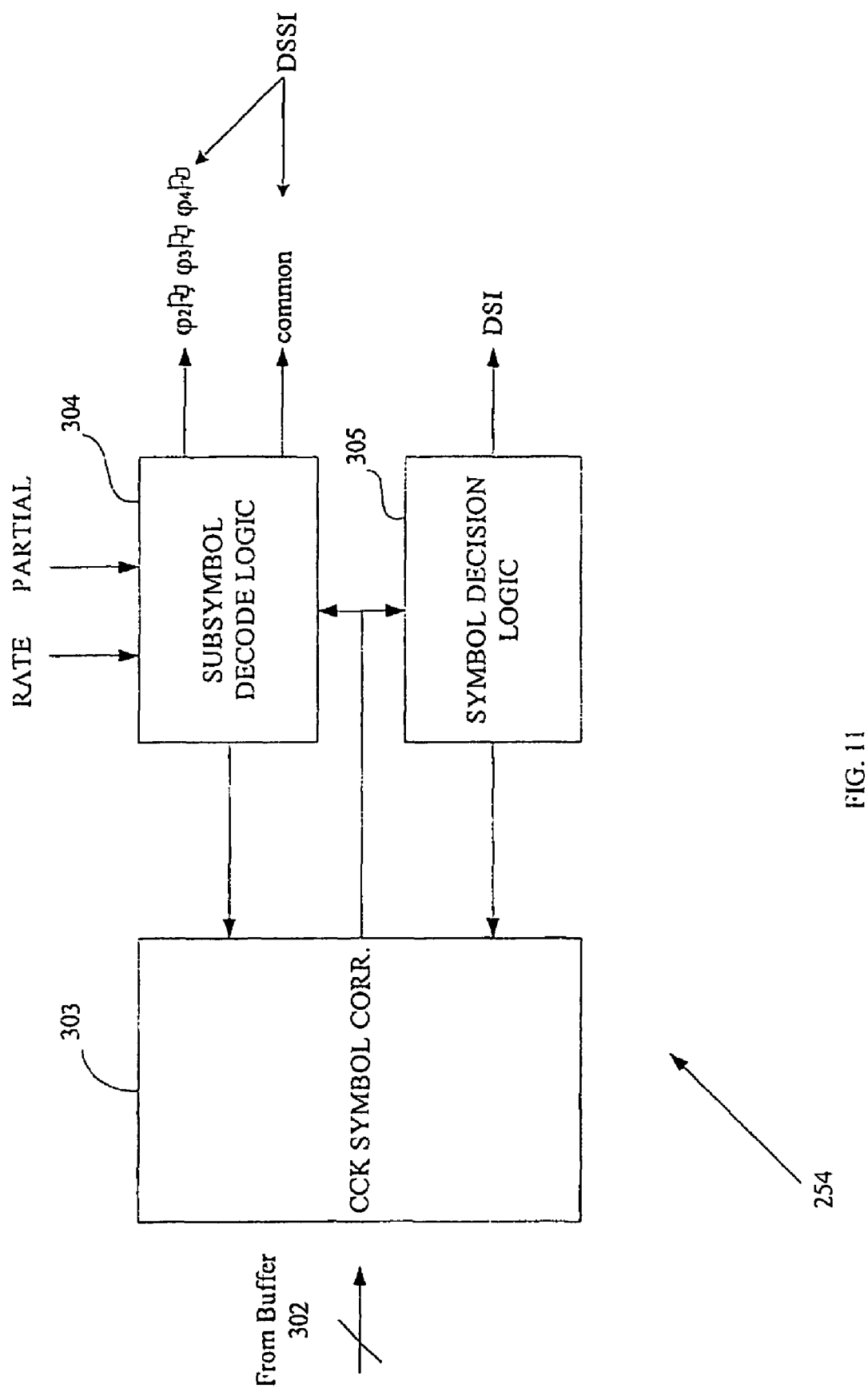
FIG. 11 is a more detailed functional block diagram of the CCK correlation unit shown in FIGS. 3-5.

Turning now to CCK demodulation mode (i.e. PAYLOAD and HIGH_RATE is asserted), waveform Y is directed to the CCK symbol decoder 240 which, for a given CCK modulated symbol C present in Y: 1) decodes or decides C using vector correlation, lookup and complex sign detect techniques once all chips $c_0 \ldots c_7$ defining C have been perceived ("symbol decision processing", handled by the symbol decision logic 305 shown in FIG. 11); and 2) selectively ascertains decoded subsymbol information for C based on one or more subsets of perceived chips $c_0 \ldots c_7$ until the decode/decision process for C is complete ("subsymbol decoding processing", handled by the subsymbol decode logic 304 shown in FIG. 11). This decoded subsymbol information is relayed to the CCK code regenerator 256 for developing corresponding complex subsymbol waveform CO.

Partial load control logic 250 controls the partial decode parallel loading process of the ascertained CO into the FBF 130 of the DFE 160, including intelligent assertion of partial load control (i.e. LOAD2, LOAD4, LOAD6, LOAD8 semaphores) based on the desired partial loading, defined here by the variable PARTIAL. PARTIAL can be fixed, predetermined and updateable and/or programmable depending on the desired implementation as is well known in the art. In one implementation consistent with the present embodiment, PARTIAL may be conveniently represented as an externally accessible bit-markable nibble within a memory or register accessible to logic 250. The high speed transmission rate RATE (here 5.5 Mbps or 11 Mbps) specified by the PLCP frame header is also relayed to the CCK Symbol Decoder 240 and CCK Code Generator 256 to assist in ascertaining the decoded subsymbol/symbol CO, as will be discussed in greater detail below.

In this embodiment, partial load control logic 250 comprises decisional logic circuitry capable of evaluating the current chip in the symbol decode sequence, perceiving and communicating which of the high speed transmission rates is specified by the PLCP frame (with reference to known PLCP preamble and header protocols), and managing the desired partial loading sequence, but any logic oriented circuit, programmed general purpose or specific purpose information processor or combination thereof may be utilized without departing from the spirit of the invention as long as such functionality can be carried out at the required chipping rates.

With reference to FIGS. 2 and 8, it should be noted that the semaphores LOAD2, LOAD4, LOAD6, or LOAD8 are issued by the partial load control logic 250 to the FBF 130 when it is desired to partially load the FBF 130 with decoded symbol/subsymbol complex waveforms at 2, 4, 6 and/or 8 chips respectively into the CCK symbol decode sequence to help counter ICI (ISI as well in the case of LOAD8). In this embodiment, LOAD2, so-named to represent the task of parallel loading the FBF 130 during chip 2 of a symbol decode sequence, may be issued to partially load into the FBF 130 decoded chips $c_0O$ and $c_1O$ of subsymbol CO ascertained by the CCK symbol/subsymbol decoder 240—CCK code regenerator 256 tandem based on chips $c_o$ and $c_1$ of the given symbol C, as will be discussed in more detail herein with reference to FIG. 4. Likewise, LOAD4 is asserted to partially load decoded chips $c0_O$ through $(c_0O \ldots c_3O)$ of decoded subsymbol CO into the first 4 delay elements 802, 806, 810, and 814 of the FBF 130 via tap inputs tap0 . . . tap3 based on received chips $c_0 \ldots c_3$ of the full CCK symbol C as will be discussed herein with reference to FIG. 3. Similarly, LOAD6 is asserted to cause parallel loading of decoded chips $c_0O \ldots$ $c_5O$ ascertained by the CCK symbol/subsymbol decoder 240—CCK code regenerator 256 tandem discussed with reference to FIG. 5, and LOAD8 is asserted to load decoded chips $c_1O \ldots c_7O$ during the 8th chip of the decode sequence of given symbol C.

A more detailed view of the CCK symbol/subsymbol decoder 240 of the current embodiment, as well as it's interaction with the CCK code regenerator 256 will now be discussed with reference to FIGS. 3, 4, 5 and 11. As shown in each of these figures, the CCK symbol/subsymbol decoder 240 includes serial to parallel buffer 302, CCK correlation unit 254, and QPSK demodulator 310. The serial to parallel buffer 302 is used to acquire the serially presented chips defining each CCK-encoded symbol contained within Y and present these chips in parallel to the CCK correlation unit 254 for correlation processing as described below. Note that the buffer 302 here makes each chip of the current symbol available to the CCK correlation unit 254 about when it is asserted by the DFE 160 so that both correlation decision processing requesting all chips of the current subsymbol as well as decoded symbol processing requiring less than all chips can be performed.

Figure 3:
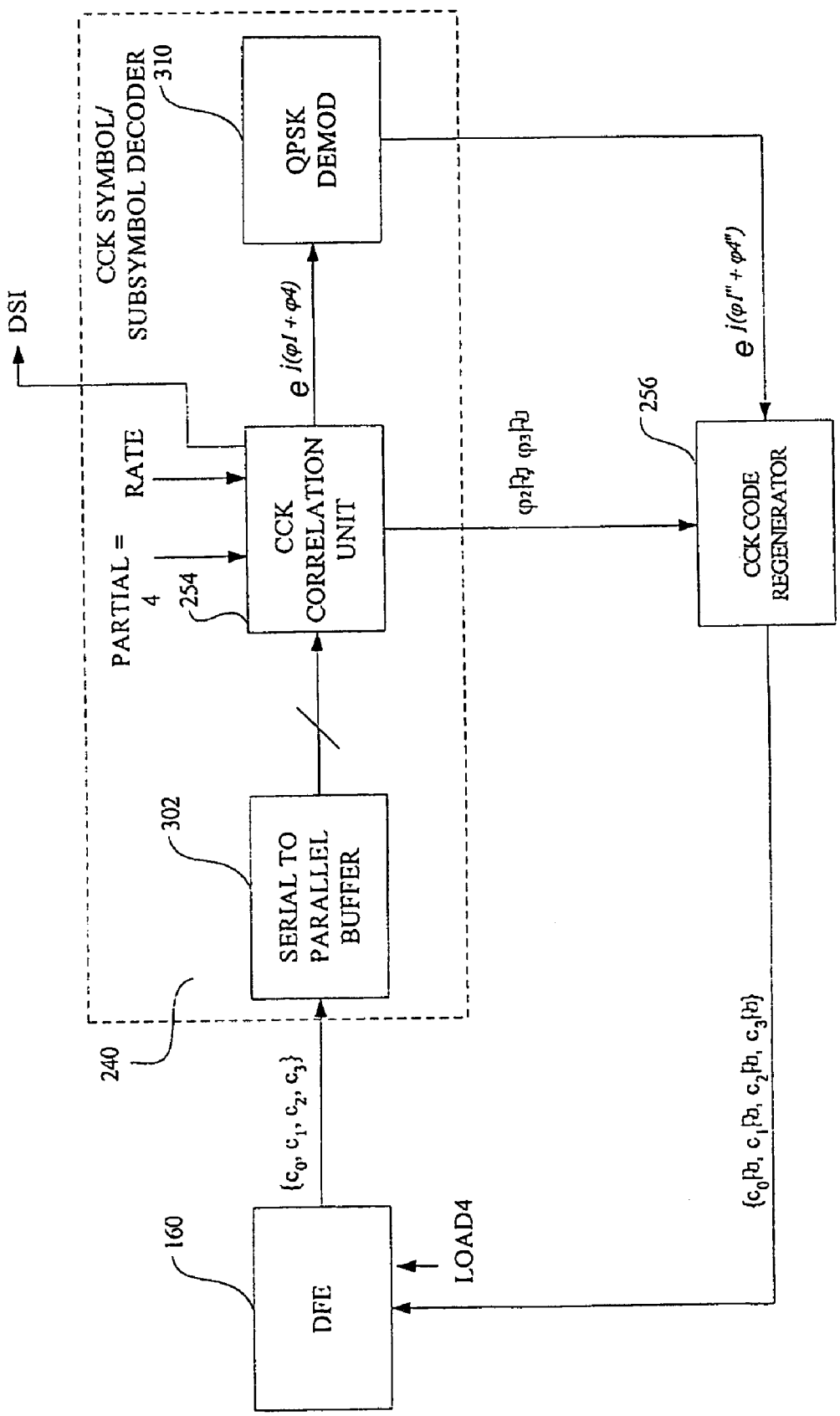
FIGS. 3, 4, and 5 illustrate partial load symbol and subsymbol decoding and regeneration processing according to the first embodiment.
Figure 4:
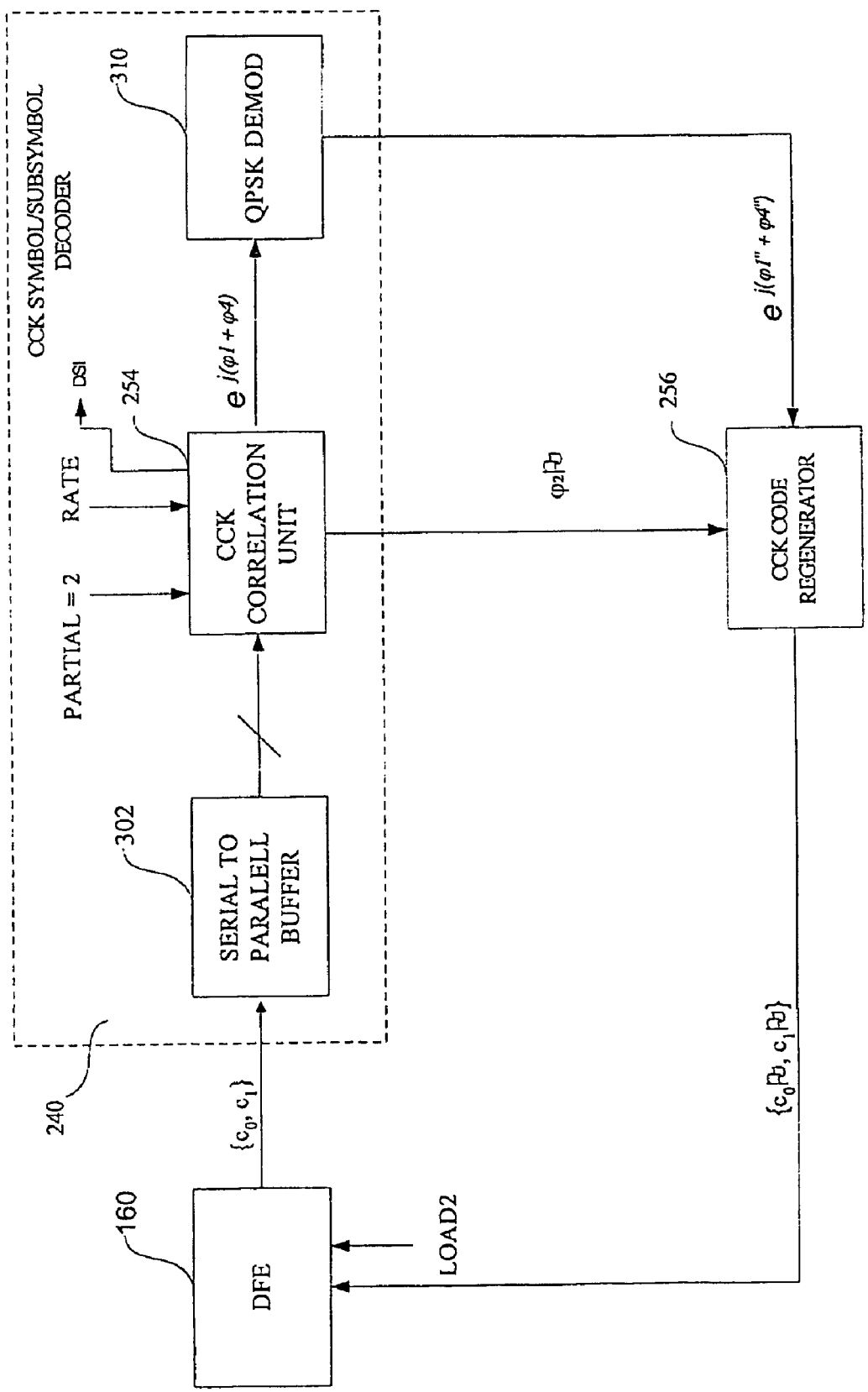
Figure 5:
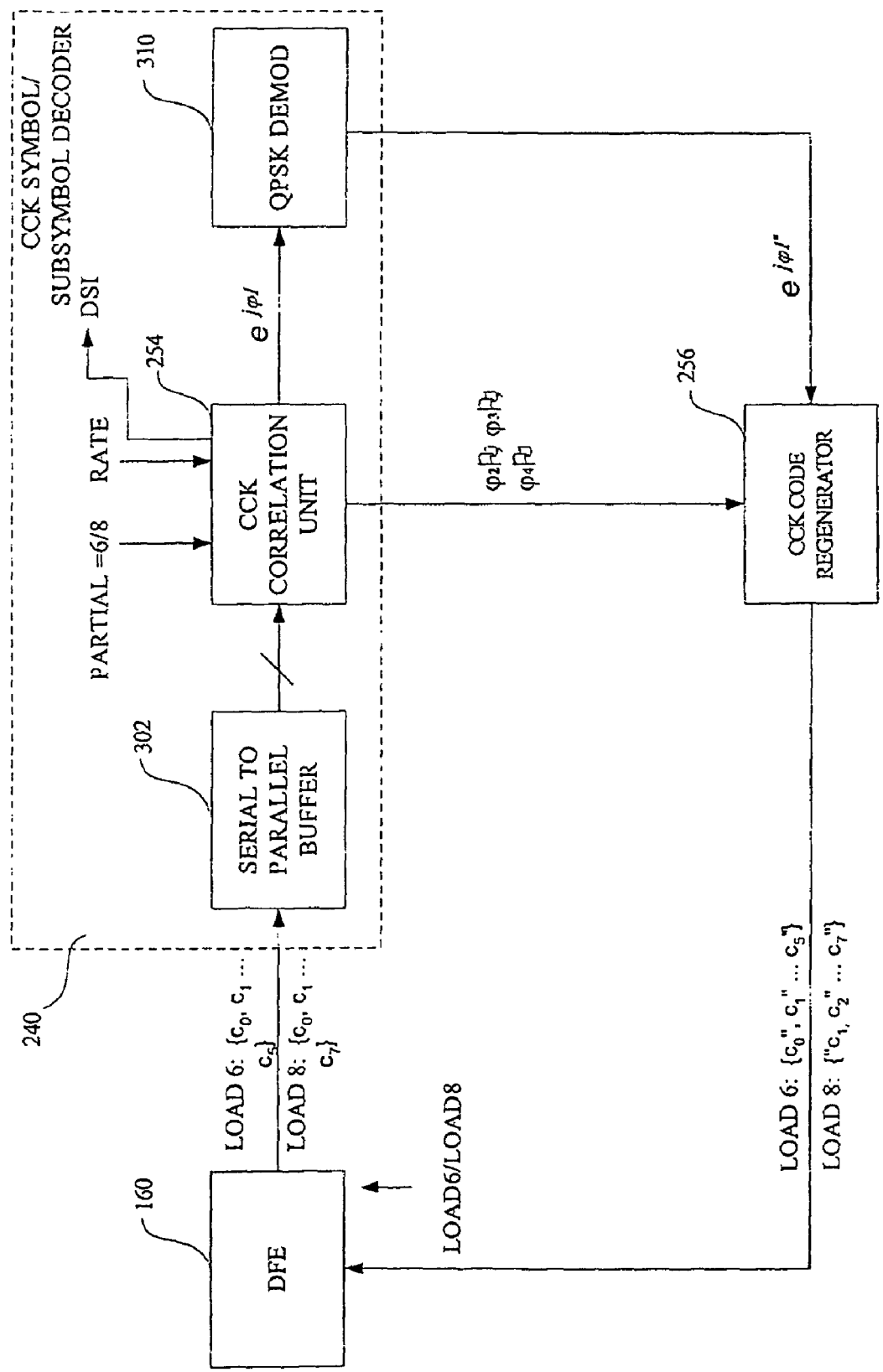

As shown in each of FIGS. 3, 4, and 5, with reference to FIG. 11, in this embodiment the CCK correlation unit 254 monitors up to all eight chips of the CCK data symbol as transmitted by the DFE 160. When all eight chips $c_0 \ldots c_7$ defining a given symbol C have been received and presented by the serial to parallel buffer 302, the symbol decision logic 305 of the CCK correlation unit 254 employs symbol decision processing and actually decodes or decides what the given symbol is from one of 64 candidate waveforms defined by the 802.11b CCK implementation forming part of CCK symbol correlator 303. This is performed here by the symbol decision logic 305 instructing the CCK symbol correlator to correlate all the received chips $c_0 \ldots c_7$ in parallel against each of 64 defined candidate waveforms as is well known in the art. The candidate waveform having the largest inner or dot product with the input complex waveform is deemed the decided symbol, and decided symbol information (labeled as "DSI" in FIG. 2) is passed along to the DQPSK demodulator 230 (FIG. 1) to complete phase decoding in a known manner so that the data X corresponding to the decided symbol can be realized.

If, however, less than all chips of the current symbol have been transmitted by the DFE 160, the CCK correlation unit 254 instead employs subsymbol decoding processing with the aid of the subsymbol decode logic 304, which, in addition to monitoring the perceived chips of the current symbol, also monitors the PARTIAL and RATE variables issued and maintained by the partial load control logic 250 (FIG. 2). As will be discussed further below, the PARTIAL and RATE data are used in subsymbol decoding processing according to this embodiment to assist the subsymbol decode logic 304 of the CCK correlation unit 254 establish a subset of valid candidate waveforms from the constellation of 64 candidate waveforms used in symbol decision processing, as contained in CCK correlation unit 303. In turn, this subset of candidate waveforms is correlated against a certain number of received chips (as directed in PARTIAL) of the current symbol to obtain decoded subsymbol and corresponding decoded subsymbol information (DSSI in FIG. 2). In this particular embodiment, the subsymbol decoding logic 304 of the CCK correlation unit 254 provides the unique angles $\phi 2O$, $\phi 3O$, and or $\phi 4O$ of the decoded subsymbol or the most correlated complex vector waveform, based on the perceived chips of C, RATE and PARTIAL variables, to the CCK code regenerator 256 to assist in constructing CO for a given symbol C. Likewise, the subsymbol decode logic 304 of the CCK correlation unit 254 ascertains the waveform vector terms common to each member of the subset of valid candidate waveforms (as determined above with reference to PARTIAL and RATE) and transmits these common terms to the QPSK demodulator 310. Based on these common terms, QPSK demodulator 310 discerns the phase of the decoded subsymbol (the sum $\phi1+\phi4$ in the LOAD2, LOAD4 scenarios and $\phi1$ in the LOAD6, LOAD8 scenarios) and then issues a decoded common term (e.g. $e^{j(N1''+N4'')}$ or $e^{jN1''}$) to the CCK code regenerator 256.

In order to better understand how subsymbol decoding processing according to the present embodiment occurs, consider first the case where it is desired that the FBF 130 be partially loaded at the 4th chip into the full symbol decode sequence (LOAD4 scenario). Referring to FIG. 3, the CCK correlator unit 254 obtains the first 4 chips of the a given symbol $\{c_0, c_1, c_2, c_3\}$ from the output of the serial to parallel buffer 302. Each 802.11b CCK symbol is defined as follows using vector notation:

$$\text{Symbol} = \{e^{j(N1+N2+N3+N4)}, e^{j(N1+N3+N4)}, e^{j(N1+N2+N4)}, -e^{j(N1+N4)}, e^{j(N1+N2+N3)}, e^{j(N1+N3)}, -e^{j(N1+N2)}, e^{jN1}\}$$

The following observations may be made. With only the first 4 chips $c_0 \ldots c_3$ available, a 4 chip subsymbol, Subsymbol$_4$, may be characterized as follows:

$$\text{Subsymbol}_4 = \{e^{j(N1+N2+N3+N4)}, e^{j(N1+N3+N4)}, e^{j(N1+N2+N4)}, -e^{j(N1+N4)}\}$$

factoring common terms, we have:

$$\text{Subsymbol}_4 = \{e^{j(N2+N3)}, e^{jN3}, e^{jN2}, -1\} * e^{j(N1+N4)}$$

Next, assuming RATE=5.5 Mbps, $\phi2$ is defined within the 802.11b Standard as being either $\pi/2$ or $3\pi/2$, and $\phi3=0$, with $\phi4$ being either 1 or −1. Thus, $$\text{Subsymbol}_4 = \{e^{j(N2)}, 1, e^{jN2}, -1\} * e^{j(N1+N4)}$$

Substituting for $\phi2$ and using Euler's formula, we have either:

$$\text{Subsymbol}_4 = \{-j, 1, -j, -1\} * e^{j(N1+N4)}$$

or $$\text{Subsymbol}_4 = \{j, 1, j, -1\} * e^{j(N1+N4)}$$

Therefore, a subset of two candidate vector waveforms for predicted symbol Subsymbol$_{pred4}$ exist at the 802.11b 5.5 Mbps rate and correlation can be performed to pick the best match (i.e. most correlated vector) between the two with reference to received chips $c_0 \ldots c_3$ obtained from the DFE 160.

In this embodiment, once correlation processing is complete and the most correlated candidate vector is found, the CCK correlation unit 254 selects the corresponding $\phi2O$ value and apprises the CCK code regenerator 256 of the same. It also ascertains the common terms for the subset of valid candidates and relays this information to the QPSK demodulator 310.

As discussed previously, based on these common terms, QPSK demodulator 310 discerns the phase of the predicted symbol correlated by the CCK correlation unit 254 (here the sum $\phi1+\phi4$) and then issues a decoded common term (e.g. $e^{j(N1''+Nr'')}$) to the CCK code regenerator 256. The CCK code regenerator takes this decoded common term and decoded angle information generated by the CCK correlation unit 254 to synthesize chips $c_0O \ldots c_3O$ of CO. Though not shown in the figure, once these chips are synthesized, they are loaded into the 4 least significant delay elements of FBF 130 (FIG. 8, elements 802, 806, 810, 814) via assertion of the LOAD4 semaphore in the current chip by the partial load control logic 250.

Still referring to FIG. 3, if in fact RATE is instead=11 Mbps, the 802.11b standard states that both $\phi2$ and $\phi3$ be selected from the set of $\{0, \pi/2, \pi, 3\pi/2\}$. Hence the decoded subsymbol, Subsymbol$_4$, can be found by taking the best match out of a subset of 16 valid candidate vector waveforms, each representing a CCK symbol. As before, the angle values and common terms corresponding to this best match are discerned and issued by the CCK correlator unit 254 and QPSK demodulator 310 to the CCK code regenerator 256. In turn, the CCK code generator 256 generates and sends $\{c_0O, c_1O, c_2O, c_3O\}$ to the four least significant tap inputs (tap0 ... tap3) of FBF 130 for loading into delay elements 802, 806, 810 and 814 during the fourth chip of the current symbol decode sequence.

It should be noted here that if only LOAD4 is selected, according to this embodiment the FBF would be loaded with information from slicer 120 via mux 800 for chips 1-3, and then chips 5,6, and 7 of the current symbol decode sequence.

FIG. 4 depicts the LOAD2 scenario, used when it is desired to parallel load the FBF 130 after only 2 chips deep into the current symbol decode sequence, and is at least effective for canceling ICI and enhancing processing gain in a 5.5 Mbps RATE environment. In this embodiment, the decoded subsymbol Subsymbol$_2$ can be simplified to:

$$\text{Subsymbol}_2 = \{e^{jN2}, 1\} * e^{j(N1+N4)}$$

Moreover, in view of 802.11b specified values for $\phi2$, there exists a subset of 2 potential correlation candidates for RATE=5.5 Mbps and 4 if RATE=11 Mbps. In the embodiment shown in FIG. 4 as well as the alternative embodiment shown in the flowchart of FIGS. 7A-7B, specifying LOAD2 while in 11 Mbps rate mode will not be honored by the partial load control logic 250 as it has been discovered by the inventors that the experienced processing gain at the 11 Mbps transmission rate is negligible.

As before, the angle values and common terms corresponding to this best match are issued by the CCK correlation unit 254 and QPSK demodulator 310 to the CCK code regenerator 256. In this instance, the CCK code generator 256 generates and sends $\{c_0O, c_1O\}$ to the two least significant tap inputs (tap0, tap1) of FBF 130 for loading delay elements 802 and 806 during the second chip of the current code symbol.

FIG. 5 depicts LOAD6 and LOAD8 scenarios, used when it is desired to parallel load the FBF 130 with decoded subsymbol or symbol chips during the 6th and 8th chip of the symbol decode sequence respectively. Here, Subsymbol$_6$ takes the general form:

$$\text{Subsymbol}_6 = \{e^{j(N2+N3+N4)}, e^{j(N3+N4)}, e^{j(N2+N4)}, -e^{jN4}, e^{j(N2+N3)}, e^{jN3}\} * e^{jN1}$$

However, it should be noted here that for design simplification considerations only in the present embodiment, a common subset of candidate vectors are utilized for both LOAD8 and LOAD6 modes and so here Subsymbol$_6$ becomes an eight term vector with $c_6=c_7=0$. In either case, therefore, if RATE=5.5 MBps, the CCK correlation unit 254 must consider the received chips of C against 4 potential candidates ($\phi2$ and $\phi4$ have 2 potential values at 5.5 Mbps). Likewise in the case RATE=11 Mbps, the best match for C must be considered with reference to the complete constellation of 64 potential candidates—$\phi1$, $\phi2$, and $\phi3$ each have 4 potential values to consider. Again, the angle values and common terms corresponding to the best match symbol (i.e. most correlated vector) within the candidate vector subset are discerned by the CCK correlation unit 254, the phase of common term φ1 is decoded and $e^{j\phi1"}$ issued by the QPSK modulator 310 to the CCK code regenerator 256.

In accordance with this embodiment, the CCK code generator 256 generates and sends {$c_0O, c_1O, \ldots, c_5O$} in the LOAD6 situation to the first six tapped delay elements 802, 806, 810, 814, 818, and 822 of the FBF 130 (see FIG. 8) via inputs tap0 ... tap5, and, in the case of the LOAD8 scenario, generates and sends the 7 latest chips {$c_1O, c_2O, \ldots, c_7O$} of in this case decoded symbol C" (as opposed to subsymbol in the case of the LOAD2, LOAD4, and LOAD6 scenarios) to all seven tapped delay elements 802, 806, 810, 814, 818, 822, 826 of FBF 130 via tap inputs tap0 ... tap6 for loading during the eighth chip of the current symbol decode sequence.

Figure 6:
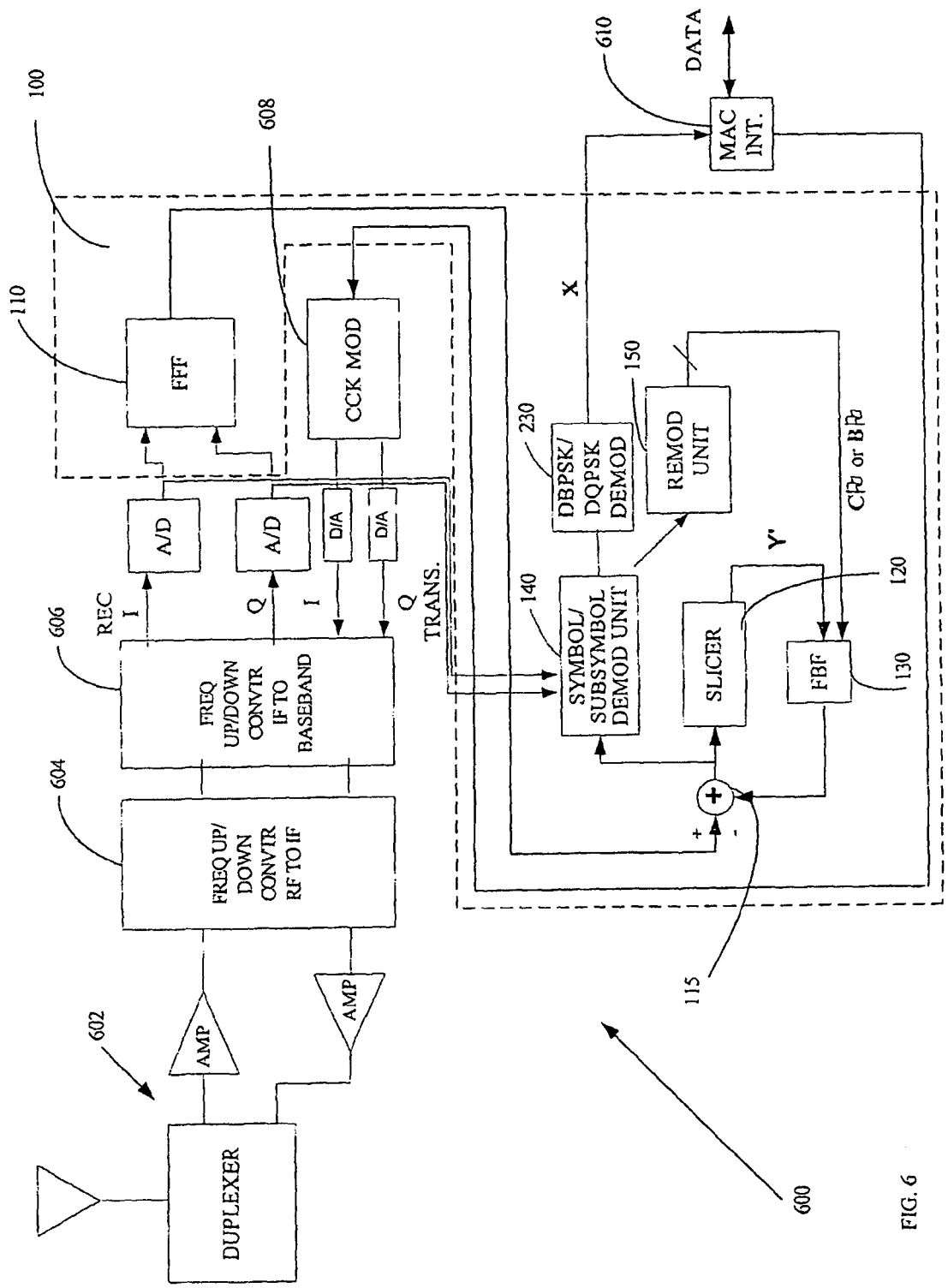
FIG. 6 is a functional block diagram of a transceiver consistent with the disclosed embodiments of the invention.

FIG. 6 is a functional block diagram showing an example of a transceiver 600 including the decoding unit 100 implemented according to the first embodiment of the invention. As such, FIG. 6 shows an RF stage 602 including conventional duplexing and amplification units coupled to RF-IF conversion stages 604 and 606 for converting between RF/IF energy useful for wireless transmission between baseband in-phase (I) and quadrature waveforms which together define baseband digital signal M after conventional analog to digital conversion. As mentioned previously, M is processed by the decision feedback unit 100 to provide corresponding bitstream X to be handled by the MAC interface 610 as e.g. voice or data information, as is well-known in the art.

Figure 7A:
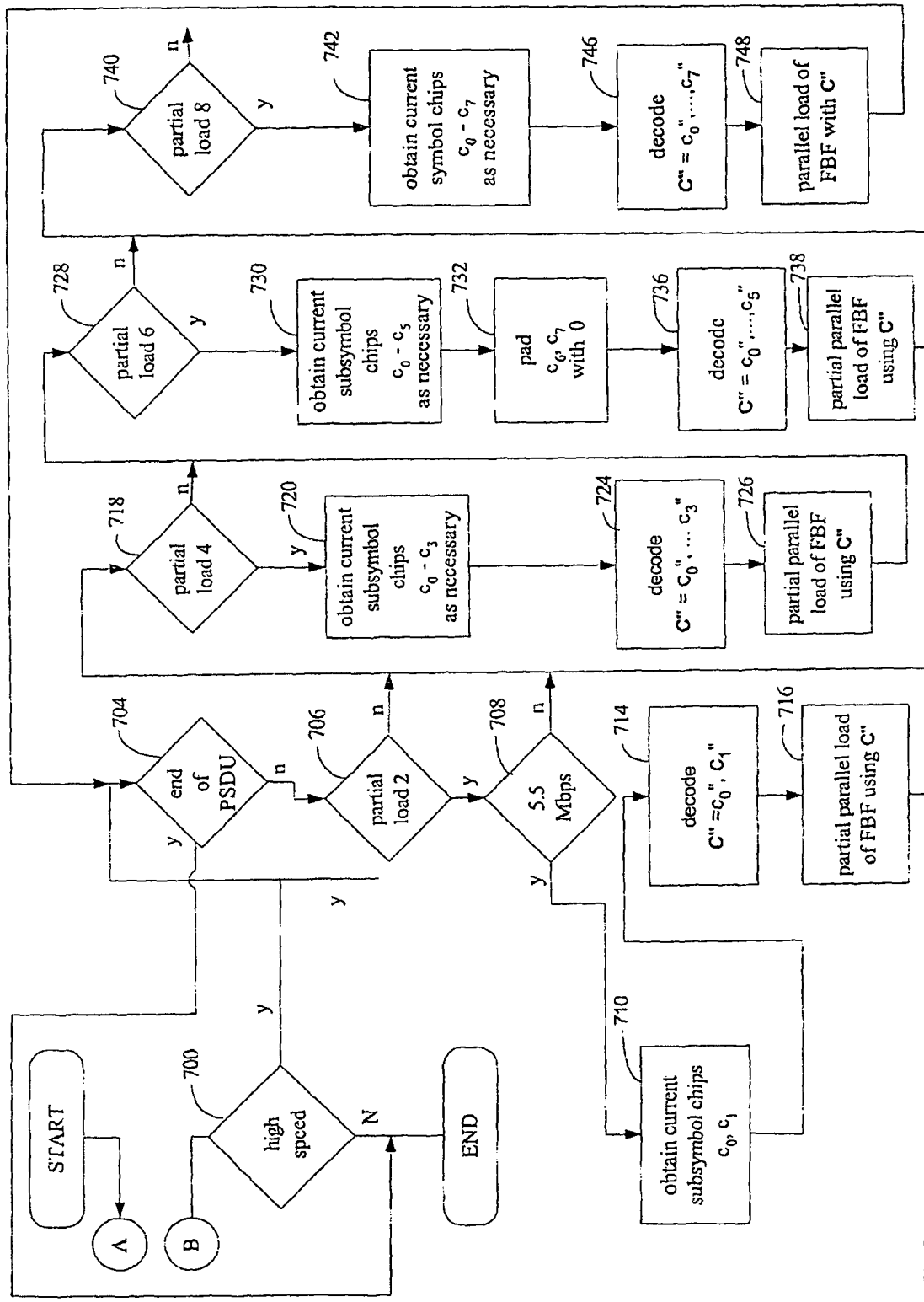
FIGS. 7A, 7B are flowcharts illustrating equalization processing according to a second embodiment of the invention.
Figure 7B:
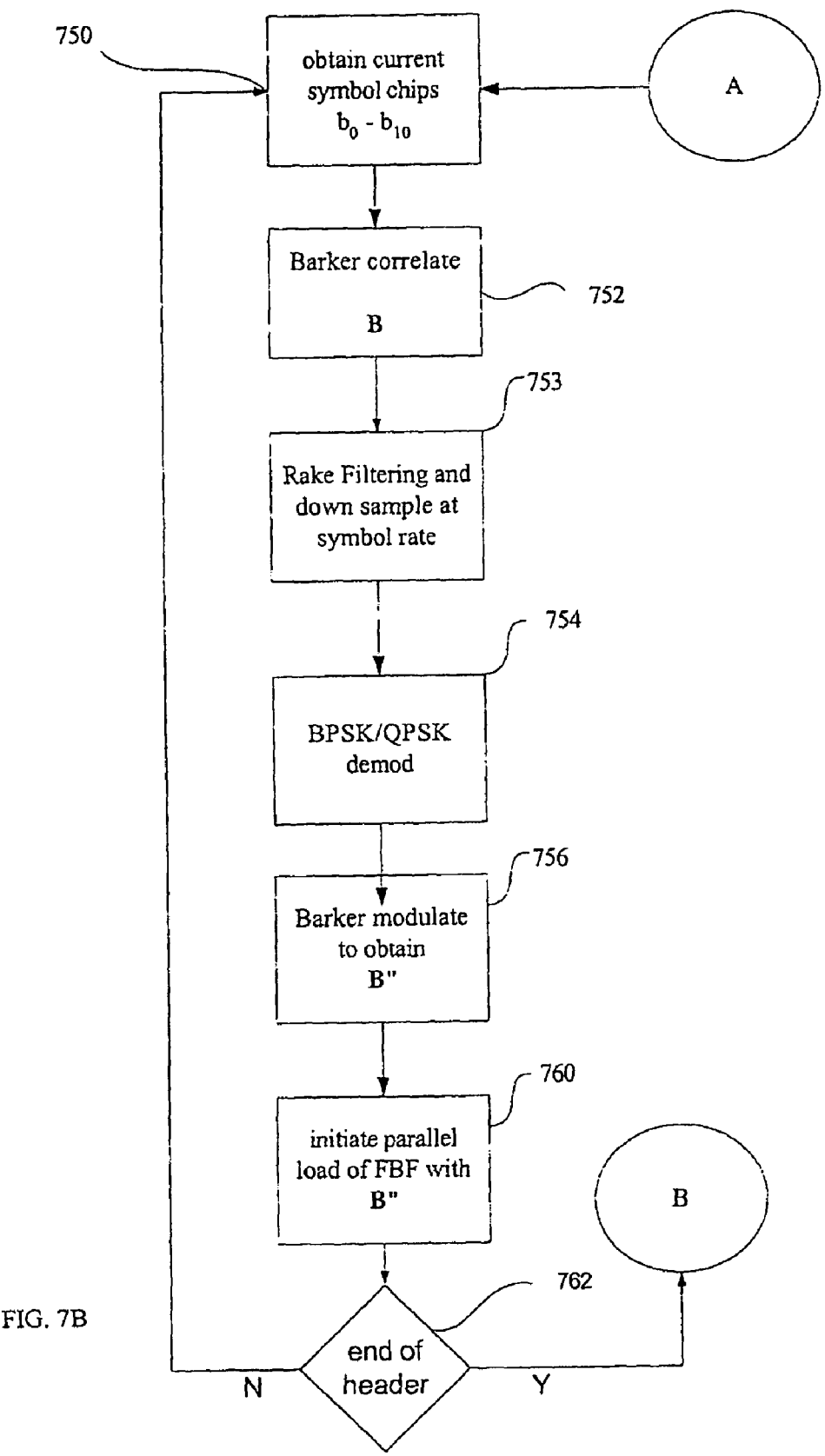

FIGS. 7A and 7B are flowcharts illustrating symbol decision, symbol/subsymbol decoding, and equalization processing according to a second embodiment of the invention. In this embodiment, an information processor capable of accessing a memory such as a general or specific purpose microprocessor, microcontroller or signal processor coupled to primary and/or secondary storage as is well-known in the art can be programmed to perform one or more of the functions of the digital feedback unit 100 generally without departing from the spirit of the invention and in particular can conveniently undertake the functions of the symbol demodulation unit 140, remodulation unit 150 and/or the FBF 130 of the DFE 160 (FIG. 1). Consistent with the present embodiment, it should become apparent to those ordinarily skilled in the art that any information processor, state machine, or logic circuit may be conveniently employed to carry out one or more of the functions of the decision feedback unit 100 as long as it can accommodate the signaling and timing requirements needed to comply with the requirements set forth in the specific communications environment in which it operates, such as IEEE 802.11 or 802.11b wireless transmission standards. Note too, that in the first and second embodiments of the invention described herein (note step 700), it should be noted that symbol/subsymbol decoding processing is performed only when high speed payloads consistent with 802.11b are expected to be utilized. However, it is not intended that the teachings of the present invention be so limited, and in fact other contemplated embodiments contemplate no such dependencies.

FIG. 8 is a more detailed functional block diagram of a FBF 130 consistent with the above described embodiments of the invention. As mentioned previously, FBF 130 generally follows conventional feedback filter design concepts, with the noted addition of the aforementioned parallel load muxes 800, 804, 808, 812, 816, 820, and 824 controlled by partial load control semaphores LOAD2, LOAD4, LOAD6, LOAD8, or LOAD_BARKER. As noted above, these muxes used to partially or fully load chips of decoded symbol or subsymbol waveform information generated by the remodulation unit 150 into the shift registers or delay elements 802, 806, 810, 814, 818, 822, and 826 through tap inputs tap0 ... tap6 respectively. In addition, the feedback parameters for hfb1(n) ... hfb7(n) are, in this embodiment, calculated using known least mean squares or similar techniques.

Figure 9:
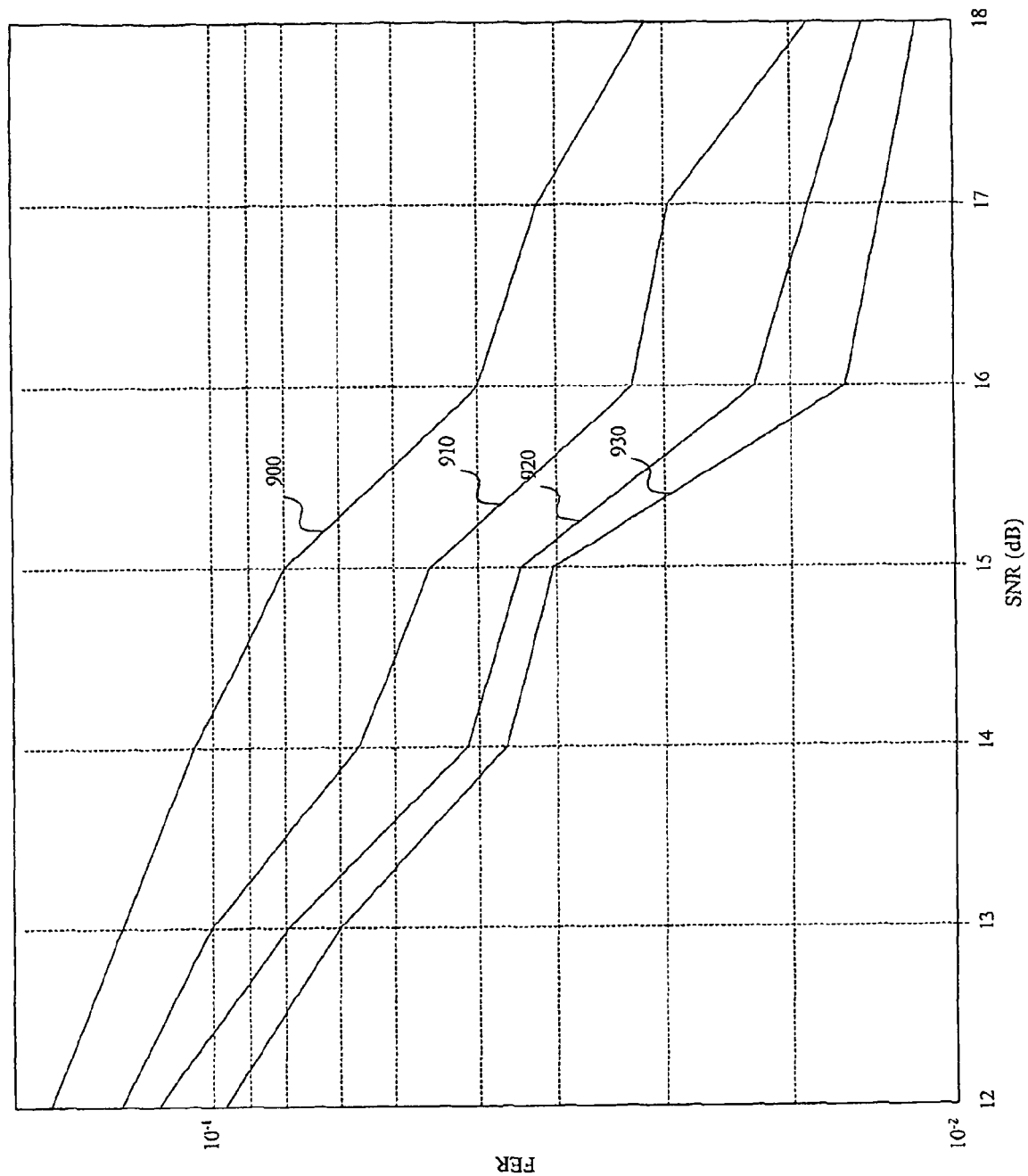
FIGS. 9 and 10 illustrate the performance of equalization processing consistent with the disclosed embodiments of the invention.

FIG. 9 is a plot illustrating reception accuracy exhibited by an 11 Mbps RATE transceiver implementation (antenna diversity enabled) utilizing decoding and equalization techniques consistent with the above-described embodiments. Predetermined CCK modulated payload data is assimilated into test PLCP frames and transmitted using known techniques in a simulated noise environment, and receiver employing the processes and devices consistent with the above-described embodiments performance parameters are simulated. A 125 nS delay spread and RMS phase noise of 4.5 degrees is imputed into the test frames to simulate an exponential delay multipath channel environment. Experienced frame error rates are reported against signal to noise ratio, and curves are plotted based on 4 differing scenarios: (1) no feedback loading 900 other turn slicer 120 output; (2) load the FBF 130 with decoded symbol chips during the $8^{th}$ chip into the current symbol decode sequence 910; (3) load the FBF 130 with decoded subsymbol and symbol chips on the $4^{th}$ and $8^{th}$ chips into the current symbol decode sequence 920 respectively; and (4) load the FBF 130 with decoded symbol/subsymbol chips every 4, 6 and 8 chips into the current symbol decode sequence. From this figure, the experienced FER is reduced by more than 2 db.

Figure 10:
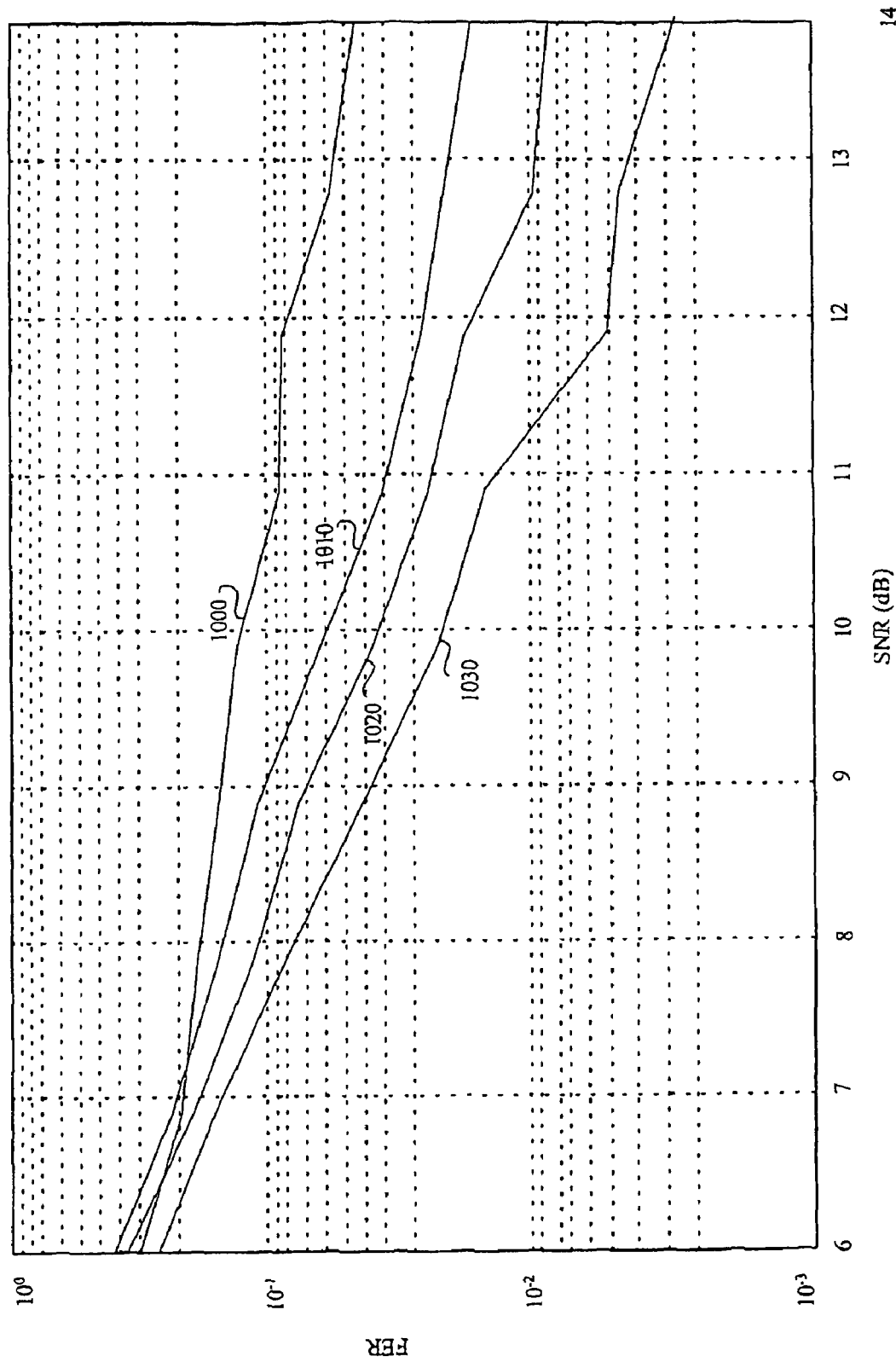

FIG. 10 is similar to FIG. 9, except that 5.5 Mbps transmission RATE receiver performance is simulated. In this case, the uppermost curve 1000 represents experienced FER vs. transmitted SNR where no feedback loading is utilized other than slicer 120 output. Curve 1010 depicts experienced FER where the FBF 130 is loaded with decoded symbol chips during the 8th chip into the current symbol decode sequence; curve 1020 represents FER vs. SNR performance where the FBF 130 is loaded with decoded subsymbol and symbol chips during the $4^{th}$ and $8^{th}$ chips into the current symbol decode sequence respectively, and the lowest curve 1030 represents FER vs. SNR performance where the FBF 130 is loaded with decoded symbol/subsymbol chips during the $2^{nd}, 4^{th}, 6^{th}$ and $8^{th}$ chips of the current symbol decode sequence.

It will be obvious to those having skill in the art that many changes may be made to the details of the above-described embodiments of this invention without departing from the underlying principles thereof. The scope of the present invention should, therefore, be determined only by the following claims.

What is claimed is:

1. A feedback equalizer comprising:
   a summing unit having a first input and an output, the first input for receiving a modulated signal, the modulated signal including a plurality of symbols defined by a first number of chips;
   a subsymbol processor coupled to the output of the summing unit, the subsymbol processor generating a decoded subsymbol waveform upon receipt of a second number of chips of one of the symbols, the second number being less than the first number; and
   a feedback filter coupled to a second input of the summing unit and the subsymbol processor, the feedback filter to filter the decoded subsymbol waveform from the modulated signal based on the second number of chips before the first number of chips of the one of the symbols is at least one of received, decoded, and decided by the subsymbol processor.

2. The equalizer of claim 1, wherein the subsymbol waveform includes a third number of chips, the third number being less than or equal to the second number.

3. The equalizer of claim 1, further comprising:
a hard decision unit coupled to the output of the summing unit, the hard decision unit for determining hard decision information associated with the modulated signal;
wherein the feedback filter is coupled to the hard decision unit and the subsymbol processor, the feedback filter to equalize the modulated signal using one of the hard decision information and the subsymbol waveform.

4. The equalizer of claim 1,
wherein the subsymbol processor comprises:
a demodulation unit coupled to the summing unit and comprising subsymbol decoding processing logic for generating decoded subsymbol information upon receiving the second number of chips of the symbol;
a remodulation unit coupled to the demodulation unit and the feedback filter, the remodulation unit generating a subsymbol waveform corresponding to the decoded subsymbol information; and
a symbol correlator coupled to the decoding processing logic, the symbol correlator to correlate the received second number of chips against a subset of valid candidate symbols to obtain a best match candidate, the decoding processing logic generating the decoded subsymbol information based on the best match candidate.

5. The equalizer of claim 4, wherein the demodulation unit further comprises decision processing logic that decides the symbol upon receipt of the first number of chips defining the symbol.

6. The equalizer of claim 5, wherein the decision processing logic comprises first and second demodulation pathways that decide the symbol by at least one of first and second distinct modulation modes.

7. The equalizer of claim 6, wherein the first and second distinct modulation modes comprise Barker spreading and complementary code keying (CCK) compliant with IEEE Standard 802.11b (1999) respectively.

8. The equalizer of claim 1, wherein the symbol is modulated in accordance with one of Barker spreading and complementary code keying (CCK) compliant with IEEE Standard 802.11b (1999).

9. A feedback equalizer comprising:
a summing unit having a first input and an output, the first input for receiving a modulated signal, the modulated signal including a Barker encoded symbol defined by a first number of chips;
a symbol processor coupled to the output of the summing unit, the symbol processor generating a decoded waveform upon receipt of a second number of chips that is less than the first number of chips of the Barker encoded symbol; and
a feedback filter coupled to a second input of the summing unit and the symbol processor, the feedback filter to filter the decoded waveform from the modulated signal based on the second number of chips before the first number of chips of the Barker encoded symbol is at least one of received, decoded, and decided by the symbol processor.

10. The equalizer of claim 9, wherein the modulated signal further includes a non-Barker encoded symbol defined by a second number of chips.

11. The equalizer of claim 10, wherein
the non-Barker encoded symbol comprises a CCK encoded symbol; and
wherein the Barker encoded and CCK encoded symbols are modulated in compliance with IEEE Standard 802.11b (1999).

12. A feedback equalizer comprising:
means for receiving a modulated signal, the modulated signal including a Barker encoded symbol defined by a first number of chips;
means for generating a decoded subsymbol waveform upon receipt of a second number of chips that is less than the first number of chips of the Barker encoded symbol; and
means for filtering the decoded subsymbol waveform from the modulated signal based on the second number of chips before the first number of chips of the Barker encoded symbol is at least one of received, decoded, and decided by the means for generating.

13. The equalizer of claim 12, wherein the modulated signal further includes a non-Barker encoded symbol defined by a second number of chips.

14. The equalizer of claim 13, wherein
the non-Barker encode symbol comprises a CCK encoded symbol; and
wherein the Barker encoded and CCK encoded symbols are modulated in compliance with IEEE Standard 802.11b (1999).

* * * * *